(12) United States Patent
Lee et al.

(10) Patent No.: US 6,691,425 B1
(45) Date of Patent: Feb. 17, 2004

(54) MULTI-FUNCTIONAL TAPE MEASURE

(76) Inventors: Choon Nam Lee, 4114 Roussean Ln., Palos Verdes Penninsula, CA (US) 90274; Kyoung Soo Choi, 625 Hickey Blvd., #A, Pacifica, CA (US) 94044

( * ) Notice: Subject to any disclaimer, the term of this patent is extended or adjusted under 35 U.S.C. 154(b) by 0 days.

(21) Appl. No.: 10/293,057

(22) Filed: Nov. 13, 2002

(51) Int. Cl.[7] .................................................. G01B 3/10
(52) U.S. Cl. ............................... 33/759; 33/42; 33/668
(58) Field of Search .............................. 33/759, 42, 668, 33/755, 758, 761, 765, 769, 494

(56) References Cited

U.S. PATENT DOCUMENTS

| | | | | |
|---|---|---|---|---|
| 1,303,756 A | * | 5/1919 | Ballou | 33/758 |
| 3,509,631 A | * | 5/1970 | Shimoyama | 33/27.01 |
| 4,924,597 A | * | 5/1990 | Tursi | 33/758 |
| 5,671,543 A | * | 9/1997 | Sears | 33/668 |
| 6,442,860 B1 | * | 9/2002 | Williams et al. | 33/668 |

* cited by examiner

Primary Examiner—Christopher W. Fulton
(74) Attorney, Agent, or Firm—Park & Sutton LLP; John K. Park

(57) ABSTRACT

A tape measure comprises a housing having a bottom surface and a front surface substantially perpendicular to the bottom surface so that an opening is formed through a lower part of the front surface, a measuring tape strip elastically wound within the housing to become externally released through the opening. A hook having a vertical plate and a horizontal plate extending from a mid line of the inner surface of the vertical plate where the lower surface of the horizontal plate is attachedly layered on the tape strip such that the outer end of the tape strip abuts on the mid line. A support upwardly extends from the upper surface of the horizontal plate to become parallel to the vertical plate.

20 Claims, 3 Drawing Sheets

MULTI-FUNCTIONAL TAPE MEASURE

BACKGROUND OF THE INVENTION

The invention relates to a tape measure. More particularly, the present invention relates to a multi-functional tape measure that facilitates wood board work while functioning as an accurate measurement device.

As a measurement tool widely used by non-carpenter individuals as well as carpenters, a tape measure has long been regarded as a necessity to both novices and professionals in wood board work and other construction works. Although the conventional tape measure has been serving as a convenient measurement tool, its functional usability has been disregarded that would be significantly increased by adding novel concepts to the measurement focused tool.

A demand on the market is a tape measure that provides convenience as an additional tool which facilitates, for example, drafting a straight line on a plywood. Another demand is to provide a tape measure that enables a user to easily maintain even distance between two points on, for example, a wood board while moving up or down in a posture in which one hand holds the tape measure body and the other hand holds a tip of the tape measure strip.

SUMMARY OF THE INVENTION

The present invention is contrived to overcome the conventional disadvantages. Accordingly, it is an object of the present invention to provide a multi-functional tape measure that facilitates wood board work while functioning as an accurate measurement device.

Another object is to provide a multi-functional tape measure that serves as an additional tool aiding a straight line drafting on a wood board.

A further object is to provide a multi-functional tape measure that enables a user to easily maintain even distance between two points on a wood board while moving up or down relative to the two points.

To achieve the above-mentioned objects, the tape measure comprises a housing having a bottom surface and a front surface substantially perpendicular to the bottom surface. An opening is formed through a lower part of the front surface. A measuring tape strip defined by an inner end, an outer end and a tape portion between the inner and outer ends is provided where the tape portion together with the inner end is elastically wound within the housing to become externally released through the opening of the housing when required.

A hook is provided to include a vertical plate defined by an inner surface and an outer surface, and a horizontal plate extending from a mid line of the inner surface of the vertical plate and defined by an upper surface and a lower surface. The lower surface of the hook is attachedly layered on the tape strip such that the outer end of the tape strip abuts on the mid line of the vertical plate. A support is further provided to upwardly extend from the upper surface of the horizontal plate to become parallel to the vertical plate.

Side bridges linking the support to and above the mid line of the vertical plate are formed to become shorter than the support and the vertical plate. Upper ridge lines of the side bridges are upwardly or outwardly waved. Selectively, the side bridges become closer to each other toward the support. A tape hold control may be attached to the housing to hold or release the tape portion of the tape strip by selectively pushing the tape portion against an inner wall of the housing, and a tape hold enhancer may be provided adjacent to the opening and within the housing to controllably soften the holding or releasing of the tape strip. The tape hold enhancer may be formed of a rubber material. An upper surface of the tape hold enhancer has a plurality of ridges to become abuttingly layered by the tape strip.

Alternately, a hook is formed to have a vertical plate defined by an inner surface and an outer surface, and a horizontal plate extending from a top line of the inner surface of the vertical plate so that the lower surface of the hook is attachedly layered on the tape strip such that the outer end of the tape strip abuts on the top line of the vertical plate.

An advantage of the tape measure according to the present invention is a multi-functional capability in which the vertical plate of the hook is formed extending above the tape strip to facilitate a straight line drafting on a wood board without requiring an additional tool. Another advantage is that the support spaced away from the vertical plate allows a user to place a thumb either between the support and the vertical plate, or against the support toward the vertical plate so as to stabilize grip of a cutter or pencil when the user's hands alternately holding the housing and the hook move up or down maintaining even distance between predetermined two points on a wood board, thereby realizing an accurate straight line drafting or cutting on or off the wood board.

A further advantage is an increased usability of the tape measure by which to allow a non-carpenter individual or a carpenter to easily reserve an accurate wood work as well as an accurate measurement, thereby maximizing product reliability and users' satisfaction.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE PREFERRED EMBODIMENTS

Figure 1:
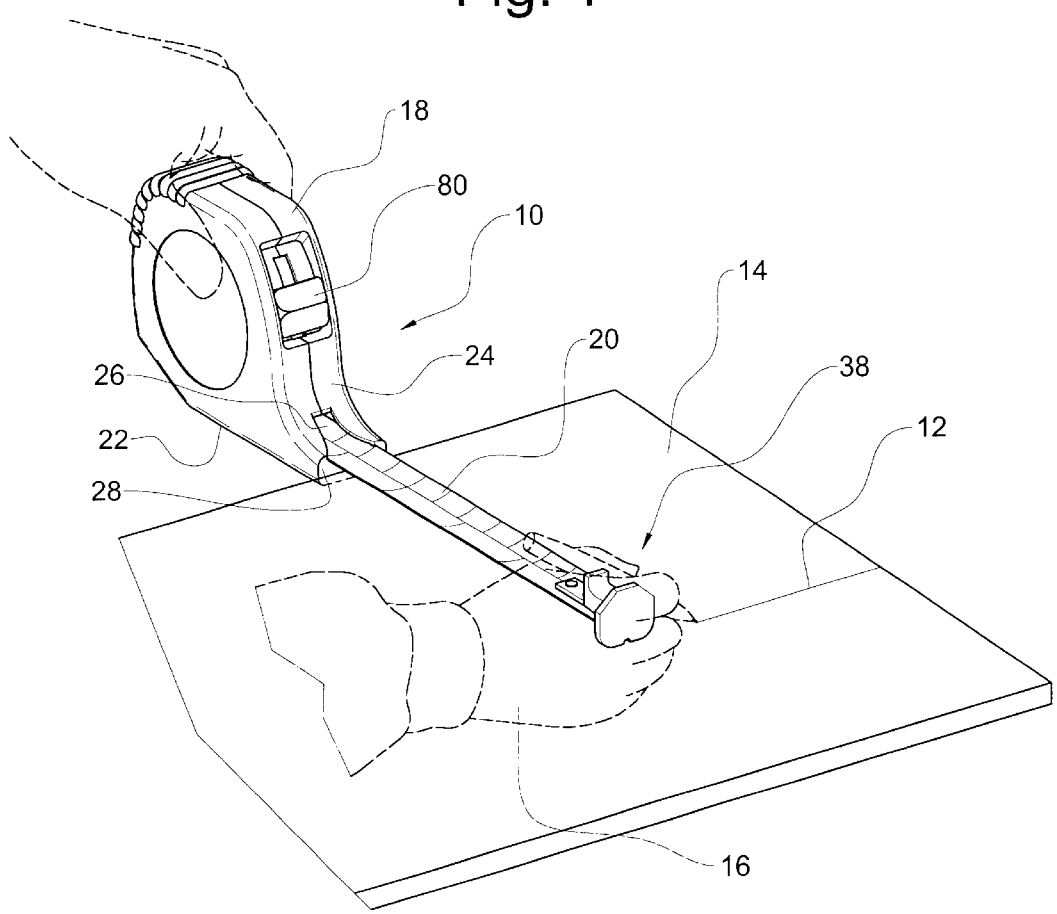
FIG. 1 is a perspective view showing an embodiment of a tape measure being applied to a wood board according to the present invention.

FIG. 1 shows an exemplary application of a tape measure 10 according to the present invention where a straight line 12 being drafted on a wood board 14 by a user 16 using the tape measure 10. As shown therein, the tape measure 10 replaces conventionally required tools such as a stick ruler or a straight bar to aid the straight line drafting on the wood board 14 and serves as a multi-functional tape measure device.

The tape measure 10 includes a housing 18 and a measuring tape strip 20. The housing 18 is provided to enclose a bottom surface 22 and a front surface 24 so that the front surface 24 becomes substantially perpendicular to the bottom surface 22. In this construction, a tape strip opening 26 is formed through a lower part 28 of the front surface 24 of the housing 18.

Figure 2:
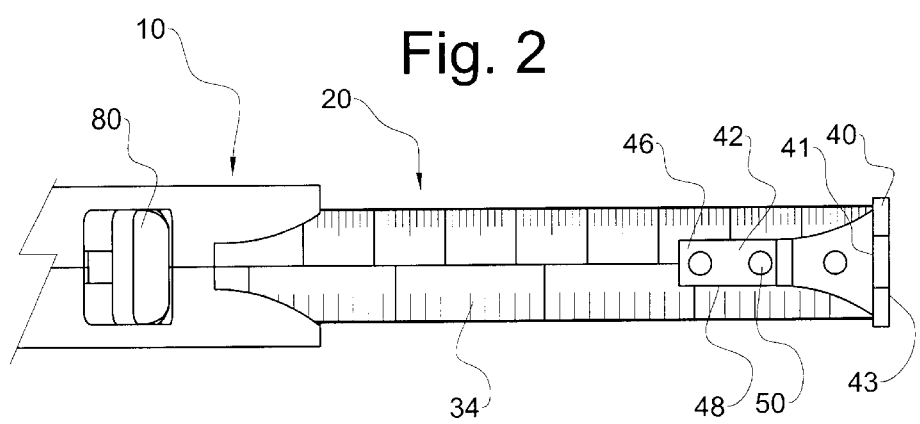
FIG. 2 is a partial plan view showing the tape measure according to the present invention.
Figure 3:
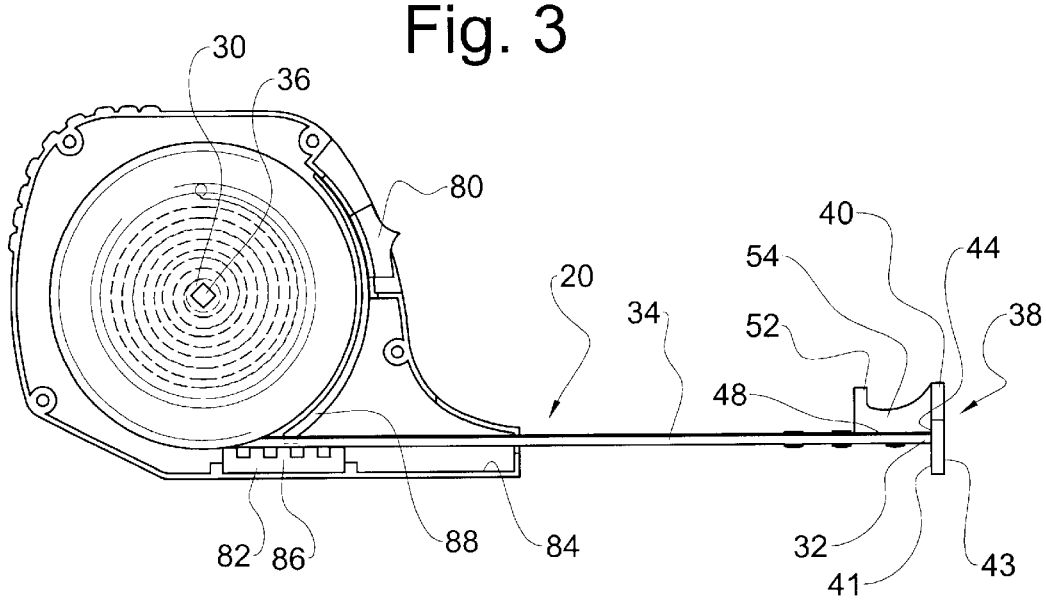
FIG. 3 is a cross-sectional front view of the tape measure according to the present invention where the tape strip stays released.
Figure 4:
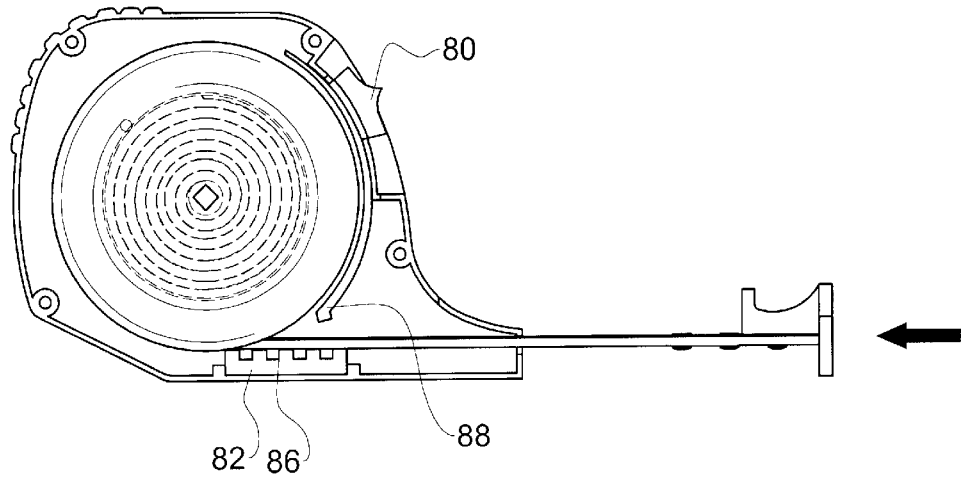
FIG. 4 is a cross-sectional front view of the tape measure according to the present invention where the tape strip is being wound.

As further shown in FIGS. 2, 3 and 4, the measuring tape strip 20 is defined by an inner end 30, an outer end 32 and a tape portion 34 between the inner and outer ends 30, 32. The tape portion 34 together with the inner end 30 is elastically coiled or wound within the housing 18 to become externally released through the opening 26 of the housing 18 when required. That is, the inner end 30 is engaged to a spring member 36 and stays coiled together with the tape portion 34 inside the housing 18 until the outer end 32 is pulled out by the user 16.

A hook 38 is attached to the outer end 32 of the tape strip 20. Specifically, the hook 38 has a vertical plate 40 and a horizontal plate 42. The vertical plate 40 is defined by an inner surface 41 and an outer surface 43. Meanwhile, the horizontal plate 42 is formed to extend from a mid line 44 of the inner surface 41 of the vertical plate 40 and defined by an upper surface 46 and a lower surface 48. Here, the lower surface 48 of the horizontal plate 42 of the hook 38 is attachedly layered on the tape strip 20 such that the outer end 32 of the tape strip 20 abuts on the mid line 44 of the vertical plate 40. Preferably, the horizontal plate 42 is attached to the tape strip 20 adjacent to the outer end 32 by rivets 50.

In a preferred version, a support 52 is formed to upwardly extend from the upper surface 46 of the horizontal plate 42 to become parallel to the vertical plate 40. It is preferred that the support 52 is equal to or shorter than the vertical plate in width. The support 52 may be used to prop the thumb of the user when a utility cutter is employed for a straight cutting of, for example, a plywood, whereas the vertical plate 40 above the mid line 44 thereof may be used to prop the thumb of the user when a pencil is employed for a straight line drafting on, for example, the wood board 14.

Figure 5:
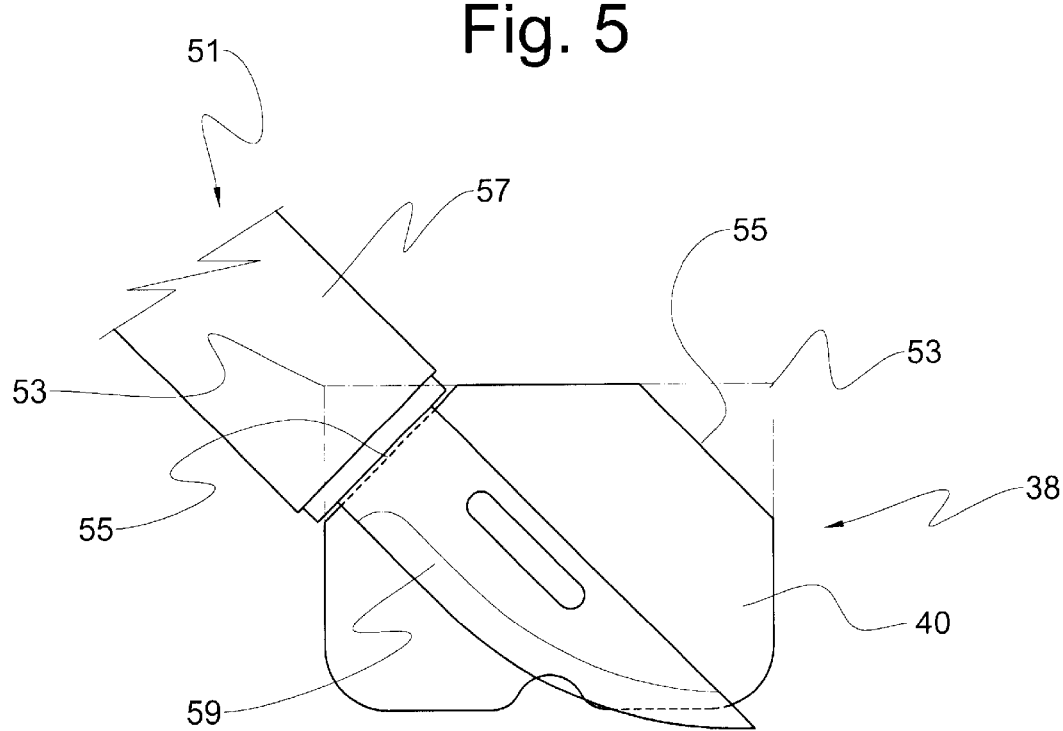
FIG. 5 is a view showing a utility knife aligned with a hook according to the present invention for straight cutting of a target.

FIG. 5 shows an application of the present invention where a utility knife 51 is hooked on the vertical plate 40. As shown therein, the vertical plate 40 above the mid line 32 thereof is substantially tapered from each upper side corner 53 thereof to provide stable seats 55 for the utility knife 51. For example, when a plaster board (not shown) is provided for straight cutting, a plastic portion 57 of the utility knife 51 can be reliably supported by the stable seat 55 while the iron blade 59 of the utility knife 51 is sidewisely supported by the outer surface 43 of the vertical plate 40. Here, a user's thumb holds the support 52 while the side of the user's index finger pushes the plastic portion 57 toward the hook 38.

The hook 38 further includes side bridges 54 to link the support 52 to and above the mid line 44 of the vertical plate 40. The side bridges 54 are formed to become shorter than the support 52 and the vertical plate 40. For a better performance, the side bridges 54 may become closer to each other toward the support 52. Also, the upper ridge lines 56 of the side bridges 54 are either downwardly or upwardly waved to an extent that the user's thumb can be stably mounted between the support 52 and the vertical plate 40 when required to perform, for example, a wood board work.

Figure 6:
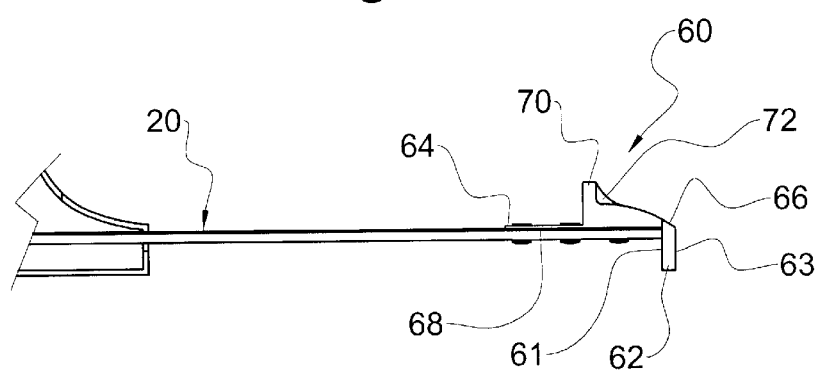
FIG. 6 is a view showing another embodiment of the present invention.

As shown in FIG. 6, the tape measure 10 is alternately provided with a hook 60 having a vertical plate 62 defined by an inner surface 61 and an outer surface 63. The hook 60 includes a horizontal plate 64 extending from a top line 66 of the inner surface 61 of the vertical plate 62. In this construction, the lower surface 68 of the horizontal plate 64 of the hook 60 is attachedly layered on the tape strip 20 such that the outer end 32 of the tape strip 20 abuts on the top line 66 of the vertical plate 62. Also, a support 70 is formed to upwardly extend from the upper surface of the horizontal plate 64 and substantially spaced away from the top line 66 of the vertical plate 62. Here, the support 70 substantially parallels the vertical plate 62. Selectively, side bridges 72 are provided to sidewisely link the support 70 toward the top line 66 of the vertical plate 62 to the horizontal plate 64. The side bridges 72 may be downwardly waved or substantially sinusoidal in curvature.

As shown back in FIGS. 3 and 4 each demonstrating a switching mechanism to release or rewind the tape strip 20, the tape measure 10 further comprises a tape hold control 80 and a tape hold enhancer 82. The tape hold control 80 serving as a control switch is attached to the housing 18 to hold or release the tape portion 34 of the tape strip 20 by selectively pushing the tape portion 34 against an inner wall 84 of the housing 18.

The tape hold enhancer 82 is provided adjacent to the opening 26 and within the housing 18 to controllably soften the holding or releasing of the tape strip 20. The tape hold enhancer 82 is preferably formed of a rubber material and glued to the inner wall 84 of the housing 18. The upper surface of the tape hold enhancer 82 or rubber material has a plurality of ridges 86 to become abuttingly layered by the tape strip 20. The tape hold control 80 includes a push end 88 to push the tape strip 20 against the ridges 86 of the tape hold enhancer 82 in accordance with operation of the tape hold control 80. For example, the tape hold control 80 is pushed down by the user 16 to hold the tape strip 20 and pulled up to release the tape strip 20.

As discussed above, the tape measure 10 according to the present invention reserves a multi-functional capability in which the vertical plate of the hook 38 is formed extending above the tape strip to facilitate a straight line drafting on a wood board without requiring an additional tool.

In addition, the support 52 or 70 spaced away from the vertical plate 40 or 62 allows a user to place a thumb either between the support and the vertical plate, or against the support toward the vertical plate so as to stabilize grip of a cutter or pencil when the user's hands alternately holding the housing and the hook moves up or down maintaining even distance between predetermined two points on a wood board, thereby realizing an accurate straight line drafting or cutting on or off the wood board.

A further advantage of the tape measure 10 according to the present invention is an increased usability by which to allow a non-carpenter individual or a carpenter to easily reserve an accurate wood work as well as an accurate measurement, thereby maximizing product reliability and users' satisfaction.

Although the invention has been described in considerable detail with reference to certain preferred versions thereof, other versions are possible by converting the aforementioned construction. Therefore, the scope of the invention shall not be limited by the specification specified above and the appended claims.

What is claimed is:

1. A tape measure, comprising:
   a) a housing having a bottom surface and a front surface substantially perpendicular to the bottom surface, wherein an opening is formed through a lower part of the front surface;
   b) a measuring tape strip defined by an inner end, an outer end and a tape portion between the inner and outer ends, wherein the tape portion together with the inner end is elastically wound within the housing to become externally released through the opening of the housing when required;

c) a hook having a vertical plate defined by an inner surface and an outer surface, and a horizontal plate extending from a mid line of the inner surface of the vertical plate and defined by an upper surface and a lower surface, wherein the lower surface of the horizontal plate of the hook is attachedly layered on the tape strip such that the outer end of the tape strip abuts on the mid line of the vertical plate; and d) a support upwardly extending from the upper surface of the horizontal plate to become parallel to the vertical plate.

2. The tape measure of claim 1 wherein the hook vertical plate above the mid line thereof is substantially tapered from each corner thereof.

3. The tape measure of claim 1 wherein the hook comprises side bridges to link the support to and above the mid line of the vertical plate.

4. The tape measure of claim 3 wherein the side bridges are formed to become shorter than the support and the vertical plate.

5. The tape measure of claim 4 wherein upper ridge lines of the side bridges are downwardly waved.

6. The tape measure of claim 5 wherein the side bridges become closer to each other toward the support.

7. The tape measure of claim 4 wherein upper ridge lines of the side bridges are upwardly waved.

8. The tape measure of claim 7 wherein the side bridges become closer to each other toward the support.

9. The tape measure of claim 1 further comprising:

a) a tape hold control attached to the housing to hold or release the tape portion of the tape strip by selectively pushing the tape portion against an inner wall of the housing; and b) a tape hold enhancer provided adjacent to the opening and within the housing to controllably soften the holding or releasing of the tape strip.

10. The tape measure of claim 9 wherein the tape hold enhancer is formed of a rubber material.

11. The tape measure of claim 9 wherein an upper surface of the tape hold enhancer has a plurality of ridges to become abuttingly layered by the tape strip.

12. The tape measure of claim 11 wherein the tape hold enhancer is formed of a rubber material.

13. A tape measure, comprising:

a) a housing having a bottom surface and a front surface substantially perpendicular to the bottom surface, wherein an opening is formed through a lower part of the front surface;

b) a measuring tape strip defined by an inner end, an outer end and a tape portion between the inner and outer ends, wherein the tape portion together with the inner end is elastically wound within the housing to become externally released through the opening of the housing when required;

c) a hook having a vertical plate defined by an inner surface and an outer surface, and a horizontal plate extending from a top line of the inner surface of the vertical plate, wherein the lower surface of the horizontal plate of the hook is attachedly layered on the tape strip such that the outer end of the tape strip abuts on the top line of the vertical plate; and d) a support upwardly extending from the upper surface of the horizontal plate and substantially spaced away from the top line of the vertical plate, wherein the support substantially parallels the vertical plate.

14. The tape measure of claim 13 wherein the hook further comprises side bridges to sidewisely link the support toward the top line of the vertical plate to the horizontal plate.

15. The tape measure of claim 14 wherein the side bridges are downwardly waved.

16. The tape measure of claim 14 wherein the side bridges are substantially sinusoidal in curvature.

17. The tape measure of claim 13 further comprising:

a) a tape hold control attached to the housing to hold or release the tape portion of the tape strip by selectively pushing the tape portion against an inner wall of the housing; and b) a tape hold enhancer provided adjacent to the opening and within the housing to controllably soften the holding or releasing of the tape strip.

18. The tape measure of claim 17 wherein the tape hold enhancer is formed of a rubber material.

19. The tape measure of claim 17 wherein an upper surface of the tape hold enhancer has a plurality of ridges to become abuttingly layered by the tape strip.

20. The tape measure of claim 19 wherein the tape hold enhancer is formed of a rubber material.

* * * * *